US009333680B2

(12) United States Patent
Matsunaga et al.

(10) Patent No.: US 9,333,680 B2
(45) Date of Patent: May 10, 2016

(54) TIRE VULCANIZER AND METHOD FOR TRANSPORTING OR PACKAGING THE SAME

(75) Inventors: Kunio Matsunaga, Tokyo (JP); Keiichi Tomoto, Tokyo (JP); Mitsuru Morita, Tokyo (JP)

(73) Assignee: MITSUBISHI HEAVY INDUSTRIES MACHINERY TECHNOLOGY CORPORATION, Hiroshima (JP)

( * ) Notice: Subject to any disclaimer, the term of this patent is extended or adjusted under 35 U.S.C. 154(b) by 537 days.

(21) Appl. No.: 13/700,531

(22) PCT Filed: May 17, 2011

(86) PCT No.: PCT/JP2011/061267
§ 371 (c)(1),
(2), (4) Date: Nov. 28, 2012

(87) PCT Pub. No.: WO2012/114543
PCT Pub. Date: Aug. 30, 2012

(65) Prior Publication Data
US 2013/0071504 A1  Mar. 21, 2013

(30) Foreign Application Priority Data
Feb. 25, 2011  (JP) ................................ 2011-040583

(51) Int. Cl.
*B29D 30/06* (2006.01)
*B29C 35/02* (2006.01)
(Continued)

(52) U.S. Cl.
CPC ............ *B29C 35/02* (2013.01); *B29D 30/0662* (2013.01); *B65B 5/00* (2013.01); *B29L 2030/00* (2013.01)

(58) Field of Classification Search
CPC ....... B29D 30/0662; B29C 35/02; B65B 5/00
See application file for complete search history.

(56) References Cited

U.S. PATENT DOCUMENTS 4,453,902 A * 6/1984 Imbert ............... B29D 30/0601
425/28.1
5,194,267 A  3/1993 Funakoshi et al.
(Continued)

FOREIGN PATENT DOCUMENTS

CN  101827694 A  9/2010
JP  2207999 A  8/1990
(Continued)

OTHER PUBLICATIONS

Office Action issued Jul. 3, 2014, corresponds to Chinese patent application No. 201180030521.6.
(Continued)

*Primary Examiner* — James MacKey
(74) *Attorney, Agent, or Firm* — Kanesaka Berner and Partners LLP (57) ABSTRACT

Provided are a tire vulcanizer and a method for transporting or packaging the same whereby, even in cases where the overall height direction dimension of the vulcanizer exceeds size limits for domestic transportation or export packaging, the vulcanizer can easily clear said limits and be transported or packaged. A tire vulcanizer comprising tie rods extending upward from a base plate, said tie rods receiving squeezing force applied to a bolster plate and a top mold when vulcanizing a tire and guiding lifting/lowering of the bolster plate and the top mold when opening and closing the top mold. In such a tire vulcanizer, the tie rods are configured so as to be vertically dividable into at least two or more sections at a position in the length direction thereof.

7 Claims, 8 Drawing Sheets (51) Int. Cl.
  *B65B 5/00*   (2006.01)
  *B29L 30/00*  (2006.01)

(56) References Cited

U.S. PATENT DOCUMENTS 5,683,726 A * 11/1997 Mitamura et al. ........... 425/34.1
8,029,256 B2 * 10/2011 Aikawa .............. B29D 30/0601
                                                    425/34.1

FOREIGN PATENT DOCUMENTS

| JP | 5-96547 | * | 4/1993 |
| JP | 9-123178 A | | 5/1997 |
| JP | 9-239734 A | | 9/1997 |
| JP | 2008-221554 A | | 9/2008 |

OTHER PUBLICATIONS

Office Action issued Jun. 19, 2014, corresponds to Taiwanese patent application No. 100122427.
Decision to Grant a Patent dated Jun. 15, 2015, corresponding to Chinese patent application No. 201180030521.6.
Decision to Grant a Patent dated Jul. 29, 2015, corresponding to Taiwanese patent application No. 100122427.
Notice of Allowance issued Jan. 19, 2015, corresponding to Korean patent application No. 10-2012-7033024.
A JP Decision to Grant, dated Jan. 31, 2012, issued in JP Application No. 2011-040583.
An International Search Report and Written Opinion, dated Aug. 2, 2011, issued in International Application No. PCT/JP2011/061267.

* cited by examiner

TIRE VULCANIZER AND METHOD FOR TRANSPORTING OR PACKAGING THE SAME

RELATED APPLICATIONS

The present application is based on International Application No. PCT/JP2011/061267, filed May 17, 2011, and claims priority from, Japanese Application No 2011-040583 filed Feb. 25, 2011

TECHNICAL FIELD

The present invention relates to a tire vulcanizer in which tie rods receive squeezing force when vulcanizing a tire and guide the lifting/lowering of a bolster plate and a top mold; and a method for transporting or packaging the tire vulcanizer.

BACKGROUND ART

Column-type tire vulcanizers used to vulcanize green (raw) tires and manufacture product tires are known that comprise a pair of tie rods (columns) extending upward from a base plate that bears squeezing force applied to a bolster plate and a top mold when vulcanizing a tire and guide the lifting/lowering of the bolster plate and the top mold when opening and closing the top mold (e.g. see Patent Document 1).

Because these tie rods have the functions of locking the bolster plate and the top mold in the fully closed position of the top mold when vulcanizing a green tire, and receiving the squeezing force when vulcanizing a tire, they are considered to be reinforcing members. Additionally, these rods function as guides to lift the bolster plate and the top mold to the fully open position of the top mold when the vulcanization is complete and the top mold is opened to unload the vulcanized tire. Therefore, the rods are also considered to be elongated rods having a length commensurate to the stroke thereof.

CITATION LIST

Patent Literature

{PTL 1}
Japanese Unexamined Patent Application Publication No. 2008-221554A

SUMMARY OF INVENTION

Technical Problem

With tire vulcanizers such as those described above, each of the pair of tie rods is configured as an integrated, elongated reinforcing member. Therefore, depending on the size of the tire vulcanizer, in a fully assembled state in which the tie rods are mounted on the base plate, the vertical direction dimension (overall height direction dimension) of the entire vulcanizer may be extremely great.

As a result, there have been cases where the overall height direction dimension of the vulcanizer exceeded the size limits of domestic transportation or export packaging and could not be shipped as-is in spite of being assembled and aligned at the factory. In such cases, the main constituents of the tire vulcanizer, that is, the tie rods, the base plate, a bottom plate, the bolster plate, and the like are disassembled and shipped to a tire manufacturing plant. Then, the tire vulcanizer is reassembled, realigned, and the like on-site, but this is a problem in that it leads to extra work, increased costs, and the like.

In light of the foregoing, an object of the present invention is to provide a tire vulcanizer and a method for transporting or packaging the same whereby, even in cases where the overall height direction dimension of the vulcanizer exceeds size limits for domestic transportation or export packaging, the vulcanizer can easily clear said limits and be transported or packaged.

Solution to Problem

The tire vulcanizer and method for transporting or packaging the same of the present invention employs the following means in order to solve the problems described above.

Specifically, a tire vulcanizer according to a first aspect of the present invention comprises tie rods extending upward from a base plate, said tie rods receiving squeezing force applied to a bolster plate and a top mold when vulcanizing a tire and guiding lifting/lowering of the bolster plate and the top mold when opening and closing the top mold. In such a tire vulcanizer, the tie rods are configured so as to be vertically dividable into at least two or more sections at a position in the length direction thereof.

According to the first aspect, the tie rods that have a longitudinal direction in the vertical direction are configured so as to be vertically dividable into at least two or more sections at a position in the length direction thereof. Therefore, even when the vertical direction dimension of the vulcanizer is great and, when transporting or packaging, exceeds size limits for domestic transportation or export packaging, the vulcanizer can easily clear said limits by detaching only upper sections of the tie rods that are vertically divided into at least two or more sections. Thus, it is possible to transport or package the vulcanizer without disassembling the tie rods, base plate, bottom plate, bolster plate, and the like. Further, it will not be necessary to reassemble or realign the vulcanizer at a delivery site, leading to the elimination of costs related to such work and, furthermore, the vulcanizer can be easily delivered to buildings and the like that have height restrictions. Moreover, processing of the tie rods can be facilitated because the length of each divided tie rod is shortened.

Furthermore, with the tire vulcanizer according to the first aspect, the dividing position may be configured to be between a portion bearing the squeezing force when vulcanizing a tire and a portion providing only the functionality for guiding the lifting/lowering of the bolster plate, the top mold, and the like.

With such a configuration, the dividing position of the tie rods to be divided is configured to be between the portion bearing the squeezing force when vulcanizing a tire and the portion providing only the functionality for guiding the lifting/lowering of the bolster plate, the top mold, and the like. Therefore, even though the tie rods are vertically divided at the position in the length direction, there is absolutely no effect on strength of the portion bearing the squeezing force when vulcanizing, and strength required for the tie rod can be ensured. Thus, necessary strength can be sufficiently ensured and precision when vulcanizing a tire can be maintained while providing the tie rods with a divided structure.

Furthermore, with the tire vulcanizer according to the first aspect, a tie rod (A) and a tie rod (B) of the tie rods that are divided into at least two or more sections may be configured so as to be mutually interlocked.

With such a configuration, the tie rod (A) and the tie rod (B) of the tie rods that are divided into at least two or more sections are mutually interlocked. Therefore, when the divided tie rod (A) and tie rod (B) are joined and integrated, coupling alignment and strength thereof can be easily reproduced. Thus, a vertical guide that slides up and down on the tie rod can guide without obstruction.

Moreover, with the tire vulcanizer having the configuration described above, the interlocking portions may be configured so as to be mutually fastened by a fastener element such as a bolt that is provided via a seat formed by providing a notch in an edge periphery of either the tie rod (A) or the tie rod (B).

With the configuration described above, the interlocking portions are configured so as to be mutually fastened by the fastener element such as a bolt that is provided via the seat formed by providing the notch in the edge periphery of either the tie rod (A) or the tie rod (B). Therefore, in addition to being mutually interlocked, the divided tie rod (A) and tie rod (B) can be firmly joined via the fastener element such as a bolt and, moreover, because the fastener element such as a bolt is attached via the seat formed by the notch, the fastener element such as a bolt will not obstruct the lifting/lowering of the vertical guide and the like. Thus, the strength required for the tie rods can be sufficiently ensured and vertical guide can guide without obstruction.

Furthermore, the tire vulcanizer having the configuration in which the tie rod (A) and the tie rod (B) are mutually interlocked may be configured so that the interlocking portions are mutually screw-fastened via female threads and male threads provided in ends of a recess and a protrusion of the interlocking portions, respectively.

With the configuration described above, the interlocking portions are mutually screw-fastened via the female threads and the male threads provided in the ends of the recess and the protrusion of the interlocking portions, respectively. Therefore, in addition to being mutually interlocked, the divided tie rod (A) and the tie rod (B) can be firmly mutually screw-fastened via the male threads and the female threads provided on the ends of the interlocking protrusion and recess. Moreover, because the screw-fastened portion is positioned within the tie rod, effects on the lifting/lowering of the vertical guide and the like can be reduced to zero. Thus, the strength required for the tie rods can be sufficiently ensured and vertical guide can guide without obstruction.

Furthermore, any tire vulcanizer having the configuration in which the tie rod (A) and the tie rod (B) are mutually interlocked, as described above, may be configured so that a joining face of each of the protrusion and the recess of the interlocking portions is configured to be a tapered face.

With the configuration described above, the joining face of each of the protrusion and the recess of the interlocking portions is configured to be the tapered face. Therefore, coupling alignment precision when mutually interlocking the divided tie rod (A) and tie rod (B) can be increased. Thus, precision comparable to that of an integrated tie rod can be ensured and the vertical guide can guide without obstruction while providing the tie rods with a divided structure.

Furthermore, with any of the tire vulcanizers according to the first aspect, the tie rod divided into at least two or more sections may be configured such that D1>D2 when mutually joined, wherein D1 is an external diameter of a side of the tie rod bearing the squeezing force when vulcanizing a tire, and D2 is an external diameter of a side of the tie rod providing only functionality for guiding the lifting/lowering of the bolster plate and the top mold.

With the configuration described above, the tie rod divided into at least two or more sections may be configured such that D1>D2 when mutually joined, wherein D1 is the external diameter of the side of the tie rod bearing the squeezing force when vulcanizing a tire, and D2 is the external diameter of the side of the tie rod providing only functionality for guiding the lifting/lowering of the bolster plate and the top mold. Therefore, when the tie rod divided into at least two or more sections is joined and formed into a single rod, the external diameter of the side of the tie rod providing only functionality for guiding will always fit inside the external diameter of the side of the tie rod bearing the squeezing force. Thus, coupling alignment adjusting and the like can be made unnecessary and processing can be facilitated by integrating the divided tie rod and, in this state, conducting the processing.

Furthermore, with a method for transporting or packaging a tire vulcanizer according to a second aspect of the present invention, the tire vulcanizer being a tire vulcanizer described in any of the above, the method comprises transporting or packaging the tire vulcanizer in a state wherein the bolster plate, the top mold, and the like are in a fully closed position of the top mold; and only upper sections of the tie rods that are vertically divided into at least two or more sections are detached.

According to the second aspect, a tire vulcanizer can be transported or packaged in a state wherein the bolster plate, the top mold, and the like are in the fully closed position of the top mold; and only the upper sections of the tie rods that are vertically divided into at least two or more sections are detached. Therefore, even in cases where an overall height direction dimension of the tire vulcanizer in a fully assembled state exceeds size limits for domestic transportation or export packaging, such limits can be cleared due to the bolster plate, the top mold, and the like being set to the fully closed position of the top mold and only the upper sections of the tie rods that are vertically divided being detached. Thus, it is possible to transport or package the vulcanizer as-is and eliminate unnecessary work and costs by employing a simple measure of detaching only the upper sections of the tie rods.

Advantageous Effects of Invention

With the tire vulcanizer of the present invention, even when the vertical direction dimension of the vulcanizer is great and, when transporting or packaging, exceeds size limits for domestic transportation or export packaging, the vulcanizer can easily clear said size limits by detaching only the upper sections of the tie rods that are vertically divided into at least two or more sections. Therefore, it is possible to transport or package a vulcanizer without disassembling the tie rods, the base plate, the bottom plates, the bolster plates, and the like. Further, it will not be necessary to reassemble or realign the vulcanizer at a delivery site, leading to the elimination of costs related to such work and, furthermore, the vulcanizer can be easily delivered to buildings and the like that have height restrictions. Moreover, processing of the tie rods can be facilitated because the length of each divided tie rod is shortened.

With the method for transporting or packaging a tire vulcanizer of the present invention, even when the overall height direction dimension of the vulcanizer in a fully assembled state exceeds size limits for domestic transportation or export packaging, the vulcanizer can clear such limits by setting the bolster plate, the top mold, and the like to be in the fully closed position of the top mold; and detaching only the upper sections of the tie rods that are vertically divided. Thus, it is possible to transport or package the vulcanizer as-is using a simple procedure in which only the upper sections of the tie rods are removed, and unnecessary work and cost can be eliminated.

DESCRIPTION OF EMBODIMENTS

Next, embodiments according to the present invention will be described while referring to the drawings.

[First Embodiment]
A first embodiment of the present invention will be described below using FIGS. 1 and 2.

Figure 1:
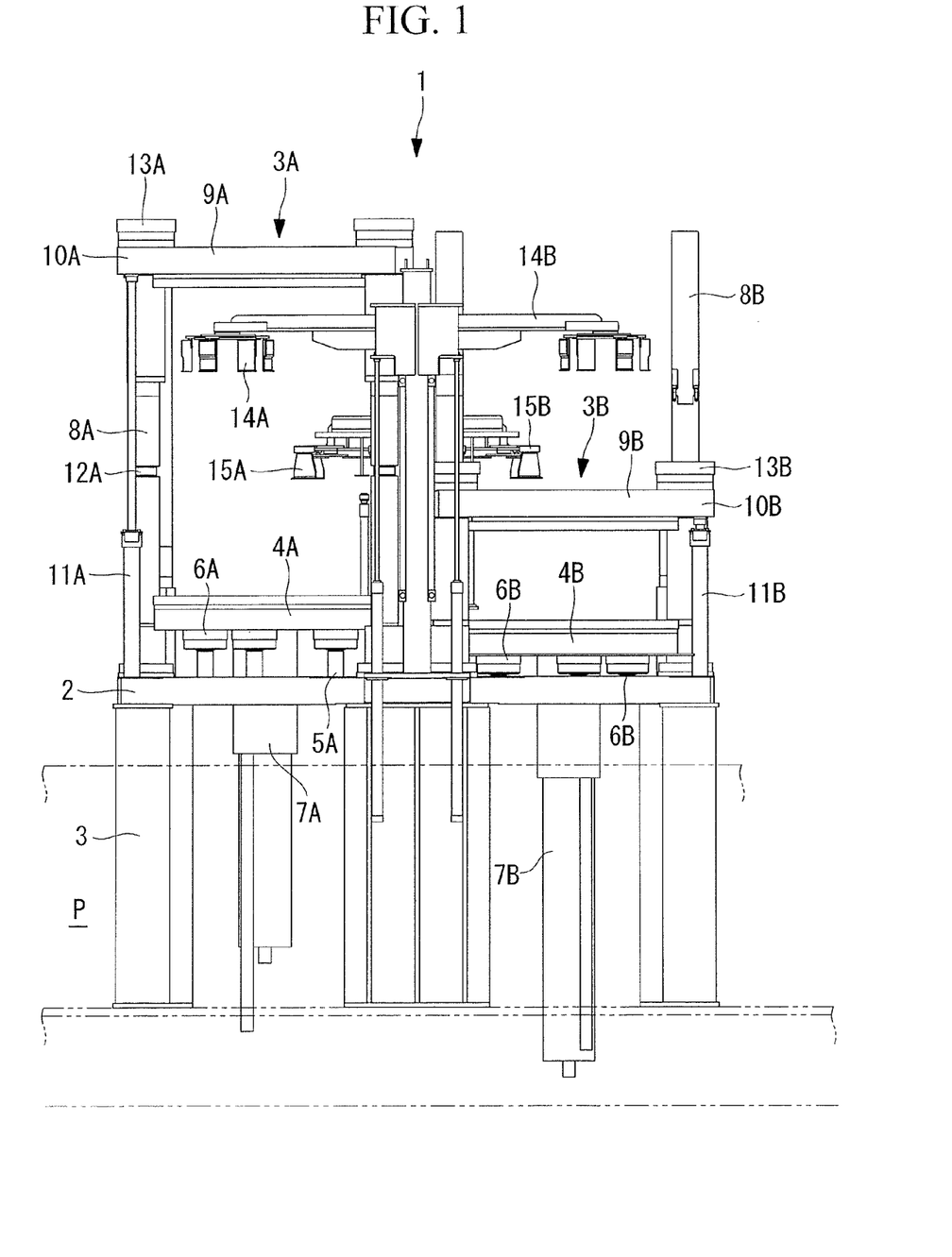
FIG. 1 is a front view of a tire vulcanizer according to a first embodiment of the present invention.

FIG. 1 is a front view of a tire vulcanizer according to the first embodiment of the present invention, and FIGS. 2A to 2E are configuration diagrams illustrating a tie rod of the tire vulcanizer.

A tire vulcanizer 1 includes a base plate 2 disposed in the horizontal direction. The base plate 2 is supported horizontally by a plurality of support columns 3 in a pit P of the tire manufacturing plant where the tire vulcanizer 1 is installed.

A pair of left and right tire vulcanization mechanisms 3A, 3B are each independently operatably mounted on the base plate 2. The pair of left and right tire vulcanization mechanisms 3A, 3B have identical configurations and, therefore, only the configuration of one tire vulcanization mechanism 3A will be described below. Regarding the other tire vulcanization mechanism 3B, only the letter "B" will be added and description thereof will be omitted.

The tire vulcanization mechanism 3A includes a bottom plate 4A to which a bottom mold (not illustrated) is attached. The bottom plate 4A is supported on the base plate 2 so as to be vertically movable via a plurality of lifting/lowering screws 5A and pressure cylinders 6A provided on an upper end of the lifting/lowering screws 5A, in order to enable height adjusting and clamping.

When shaping (molding) and vulcanizing a green tire, a center mechanism 7A attached to a center portion of the bottom plate 4A performs insertion and removal operations of a rubber bag (referred to as a "bladder") into the tire. The center mechanism 7A penetrates the base plate 2 and extends downward, and is configured so as to be vertically movable with the bottom plate 4A.

A pair of tie rods (also referred to as "columns") 8A are mounted at positions on opposite corners on the base plate 2 and extend upwards. The tie rods (column) 8A act as guides for lifting/lowering a bolster plate 9A and a top mold (not illustrated) in the vertical direction between the fully closed position of the top mold and the fully open position of the top mold. Further, when vulcanizing a tire, the tie rods 8A lock the bolster plate 9A and the top mold in the fully closed position of the top mold and receive the squeezing force that acts thereon.

The bolster plate 9A is attached to the top mold (not illustrated) and is assembled on the pair of tie rods 8A so as to be vertically movable along the vertical direction via a vertical guide 10A, and is lifted/lowered by a vertical cylinder 11A interposed between the bolster plate 9A and the base plate 2. Further, a locking mechanism 13A is provided on the vertical guide 10A of the bolster plate 9A. The locking mechanism 13A engages with a tie rod neck for locking 12A provided on the tie rods 8A, and locks the bolster plate 9A and the top mold in the fully closed position of the top mold.

A tire loading mechanism 14A for loading a green tire between the top and bottom molds is attached to the front side of the tire vulcanizer 1 so as to be vertically movable in the vertical direction and rotatable within the horizontal plane between positions where the green tire is received and transferred, with respect to the tire vulcanization mechanism 3A. Further, a tire unloading mechanism 15A for removing a vulcanized tire (that was vulcanized using the tire vulcanization mechanism 3A) from between the molds and transporting the vulcanized tire onto a conveyor is attached to the opposite side of the tire loading mechanism 14A so as to be vertically movable in the vertical direction and rotatable within the horizontal plane between positions where the vulcanized tire is received and transferred.

In the tire vulcanizer 1 described above, all constituents other than the tie rods 8A, 8B are known in the art. Hereinafter, the configuration of the characterizing constituents of the present invention, that is, the tie rods 8A, 8B will be described while referring to FIGS. 2A to 2E. As described above, the tie rods 8A, 8B act as guides when lifting/lowering the bolster plates 9A, 9B and the top molds (not illustrated) in the vertical direction between the fully closed position of the top mold and the fully open position of the top mold. Therefore, the tie rods 8A, 8B are rods that are elongated in the vertical direction and which, in a fully assembled state, control the overall height direction dimension of the tire vulcanizer 1.

Figure 2A:
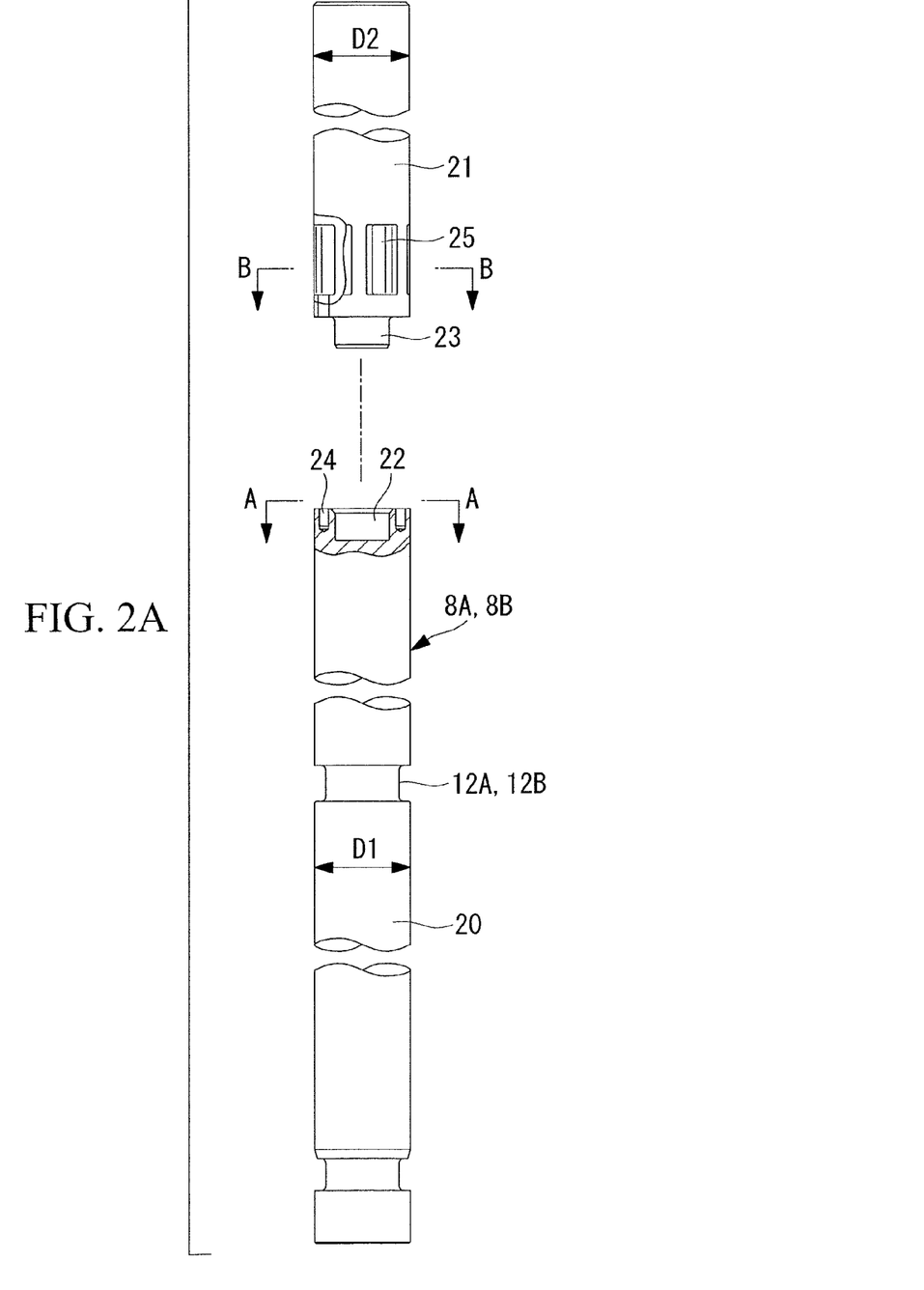
FIG. 2A is a configuration diagram of a tie rod of the tire vulcanizer illustrated in FIG. 1, and is a front view illustrating a state in which the tie rod is divided.

Thus, as illustrated in FIG. 2A, the tie rods 8A, 8B are divided vertically into at least a tie rod (A) 20 and a tie rod (B) 21 at a position in the length direction and are configured so as to be detachably integratable. Specifically, in this embodiment, the tie rods 8A, 8B include the tie rod neck for lockings 12A, 12B to which the locking mechanisms 13A, 13B engage, and are configured so as to be vertically divided into at least two or more sections between the portion bearing the squeezing force when vulcanizing a tire (i.e. the tie rod (A) 20), and the portion providing only functionality for guiding the lifting/lowering of the bolster plates 9A, 9B, the top molds, and the like (i.e. the tie rod (B) 21), which is joined to the top portion of the portion bearing the squeezing force.

The bisected tie rod (A) 20 and tie rod (B) 21 are configured so as to be integrated by mating (interlocking) a recess 22 provided in an end of a first side (the tie rod (A) 20 side in this embodiment) and a protrusion 23 provided in an end of a second side (the tie rod (B) 21 side in this embodiment).

Figure 2B:
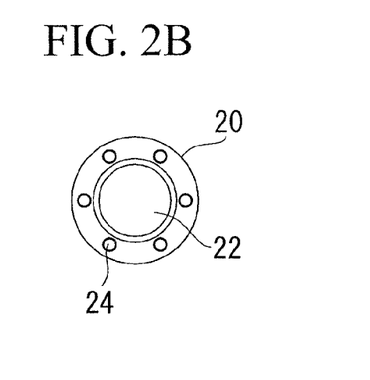
FIG. 2B is a configuration diagram of the tie rod of the tire vulcanizer illustrated in FIG. 1, and is a drawing corresponding to a cross-section taken along line A-A of FIG. 2A.
Figure 2C:
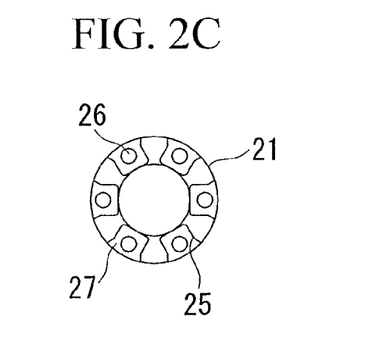
FIG. 2C is a configuration diagram of the tie rod of the tire vulcanizer illustrated in FIG. 1, and is a drawing corresponding to a cross-section taken along line B-B of FIG. 2A.
Figure 2D:
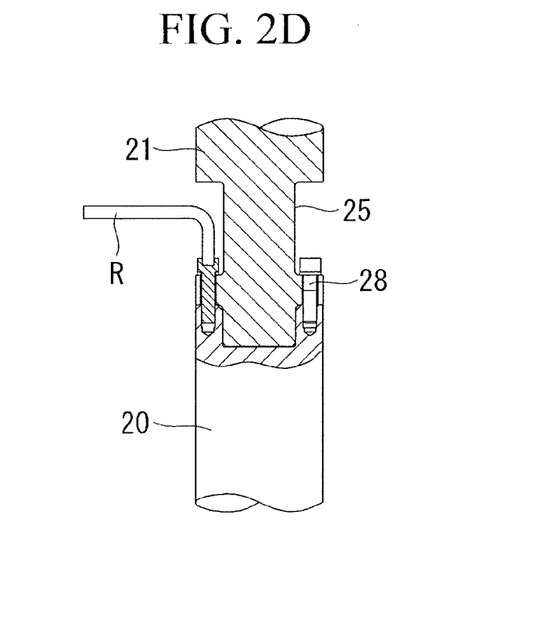
FIG. 2D is a configuration diagram of the tie rod of the tire vulcanizer illustrated in FIG. 1, and is a front view illustrating a state in which the tie rod is joined.
Figure 2E:
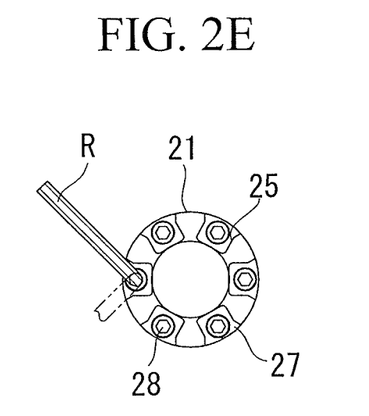
FIG. 2E is a configuration diagram of the tie rod of the tire vulcanizer illustrated in FIG. 1, and is a plan view of FIG. 2D.

Further, in the interlocking portions, as illustrated in FIG. 2B, a plurality (six) of joining holes 24 is provided so as to be spaced equally around the recess 22 on the tie rod (A) 20 side and, as illustrated in FIG. 2C, a seat 27 having a through-hole 26 is formed at equal intervals at a plurality of sites (six sites)

by notches 25 formed in an edge periphery of the tie rod (A) 21 side. Thus, a configuration is realized in which the tie rod (A) 20 and the tie rod (B) 21 are integrally joined via a fastener element such as a bolt 28. Note that FIGS. 2D and 2E illustrate a state in which a tool R is used to attach the fastener element such as a bolt 28 and join the tie rod (A) 20 and the tie rod (B) 21.

Furthermore, the tie rod (A) 20 and the tie rod (B) 21 are configured such that D1>D2 when joined (taking tolerance of the external diameter dimensions, tolerance of the recess 22 and the protrusion 23, and the like into consideration), wherein D1 is the external diameter of the tie rod (A) 20 side bearing the squeezing force when vulcanizing a tire, and D2 is the external diameter of the tie rod (B) 21 side providing only functionality for guiding the lifting/lowering of the bolster plates 9A,9B and the top molds.

Thus, the following effects are provided according to this embodiment.

In addition to the interlocking of the recess 22 and the protrusion 23, the tie rod (A) 20 and the tie rod (B) 21 are more reliably integrated by the joining between the joining holes 24 and the seats 27 via the fastener element such as a bolt 28, and are incorporated into the tire vulcanizer 1 as single elongated tie rods 8A, 8B. Moreover, in addition to functioning as guides when the bolster plates 9A, 9B and the top molds are lifted/lowered in the vertical direction by the vertical cylinders 11A, 11B, the tie rods 8A, 8B function to bear the squeezing force when the bolster plates 9A, 9B and the top molds are locked to the tie rod neck for lockings 12A, 12B via the locking mechanisms 13A, 13B when vulcanizing a tire. Note that the vulcanization method of the tire itself is known in the art and, therefore, description thereof is omitted.

The elongated tie rods 8A, 8B are attached on the base plate 2 and, therefore, the vertical direction dimension (overall height direction dimension) of the tire vulcanizer 1 may be extremely great. In cases where fully assembling the tire vulcanizer 1 in the factory and then delivering the tire vulcanizer 1 to a user, domestic transportation or export packaging is necessary. However, if the overall height direction dimension of the tire vulcanizer 1 is great, size limits related to domestic transportation or export packaging may be exceeded. Regardless, in this embodiment, the tie rods 8A, 8B are vertically dividable into at least two or more sections in the position in the length direction thereof, that is, are dividable into the tie rod (A) 20 and the tie rod (B) 21.

Therefore, even in cases where the overall height of the tire vulcanizer 1 exceeds the size limits of domestic transportation or export packaging, the height direction dimension of the tire vulcanizer 1 can be reduced an amount corresponding to the dimension of the tie rod (B) 21 through the simple procedure of first locking the bolster plates 9A, 9B and the top molds in the closed position of the mold via the locking mechanisms 13A, 13B at the tie rod neck for locking 12A of the tie rod (A) 20 side (the lower section of the tie rods 8A, 8B) and then removing only the tie rod (B) 21 (the upper sections of the tie rods 8A, 8B). Thus, the size limits will be easily cleared and the tire vulcanizer 1 can be transported or packaged.

Thus, it is possible to transport or package a vulcanizer without disassembling the main constituents, that is, the tie rods 8A, 8B, the base plate 2, the bottom plates 4A, 4B, the bolster plates 9A,9 B, and the like, even when transporting or packaging the tire vulcanizer 1 that exceeds the size limits. Further, it will not be necessary to reassemble or realign the tire vulcanizer 1 at a delivery site, leading to the elimination of costs related to such work and, furthermore, the tire vulcanizer 1 can be easily delivered to buildings and the like that have height restrictions. Moreover, processing of the tie rod (A) 20 and the tie rod (B) 21 can be facilitated because the length of each divided tie rod is shortened.

Further, the dividing position of the tie rod (A) 20 and the tie rod (B) 21 to be divided into at least two or more sections is configured to be between the portion bearing the squeezing force when vulcanizing a tire (i.e. the tie rod (A) 20) and the portion providing only functionality for guiding the lifting/lowering of the bolster plates 9A, 9B, the top molds, and the like (i.e. the tie rod (B) 21). Therefore, even though the tie rods 8A, 8B are vertically divided at the position in the length direction, there is absolutely no effect on strength of the portion bearing the squeezing force when vulcanizing, and strength required for the tie rods 8A, 8B can be ensured. As a result, necessary strength can be sufficiently ensured and precision when vulcanizing a tire can be maintained while providing the tie rods 8A, 8B with a divided structure.

Furthermore, the tie rod (A) 20 and the tie rod (B) 21 that are divided into at least two or more sections are mutually interlocked via the recess 22 provided on the tie rod (A) 20 side and the protrusion 23 provided on the tie rod (B) 21 side. Therefore, when the divided tie rod (A) 20 and tie rod (B) 21 are joined and integrated, coupling alignment and strength thereof can be easily reproduced. Thus, the vertical guides 10A, 10B that slide up and down on the tie rods 8A, 8B can guide without obstruction.

Further, the portions that are interlocked as described above are joined and fixed to each other using the fastener element such as a bolt 28 through the joining holes 24 provided on the tie rod (A) 20 side and the seats 27 formed by the notches 25 provided on the tie rod (B) 21 side. Therefore, in addition to being mutually interlocked, the tie rod (A) 20 and the tie rod (B) 21 divided into at least two or more sections can be firmly joined via the fastener element such as a bolt 28. Moreover, the fastener element such as a bolt 28 is attached via the seats 27 formed by the notches 25 and, therefore, the fastener element such as a bolt 28 will not obstruct the lifting/lowering of the vertical guides 10A, 10B and the like. Thus, the strength required for the tie rods 8A, 8B can be sufficiently ensured and vertical guides 10A,10B can guide without obstruction.

Furthermore, in this embodiment, the tie rods 8A, 8B that are dividable into at least two or more sections are configured such that D1>D2 when mutually joined, wherein D1 is the external diameter of the tie rod (A) 20 side bearing the squeezing force when vulcanizing a tire, and D2 is the external diameter of the tie rod (B) 21 side providing only functionality for guiding the lifting/lowering of the bolster plates 9A,9B and the top molds. Therefore, when the divided tie rod (A) 20 and tie rod (B) 21 are joined and integrated into a single rod, the external diameter D2 of the tie rod (B) 21 side providing only functionality for guiding will always fit inside the external diameter D1 of the tie rod (A) 20 side bearing the squeezing force. Thus, coupling alignment adjusting and the like can be made unnecessary and processing can be facilitated by integrating the divided tie rod (A) 20 and tie rod (B) 21 and, in this state, conducting the processing.

[Second Embodiment]

Next, a second embodiment of the present invention will be described below using FIGS. 3A and 3B.

The joining construction of the interlocking portions of this embodiment differs from that of the first embodiment. Aside from this one point, the second embodiment is identical to the first embodiment and description corresponding to such is omitted.

Figure 3A:
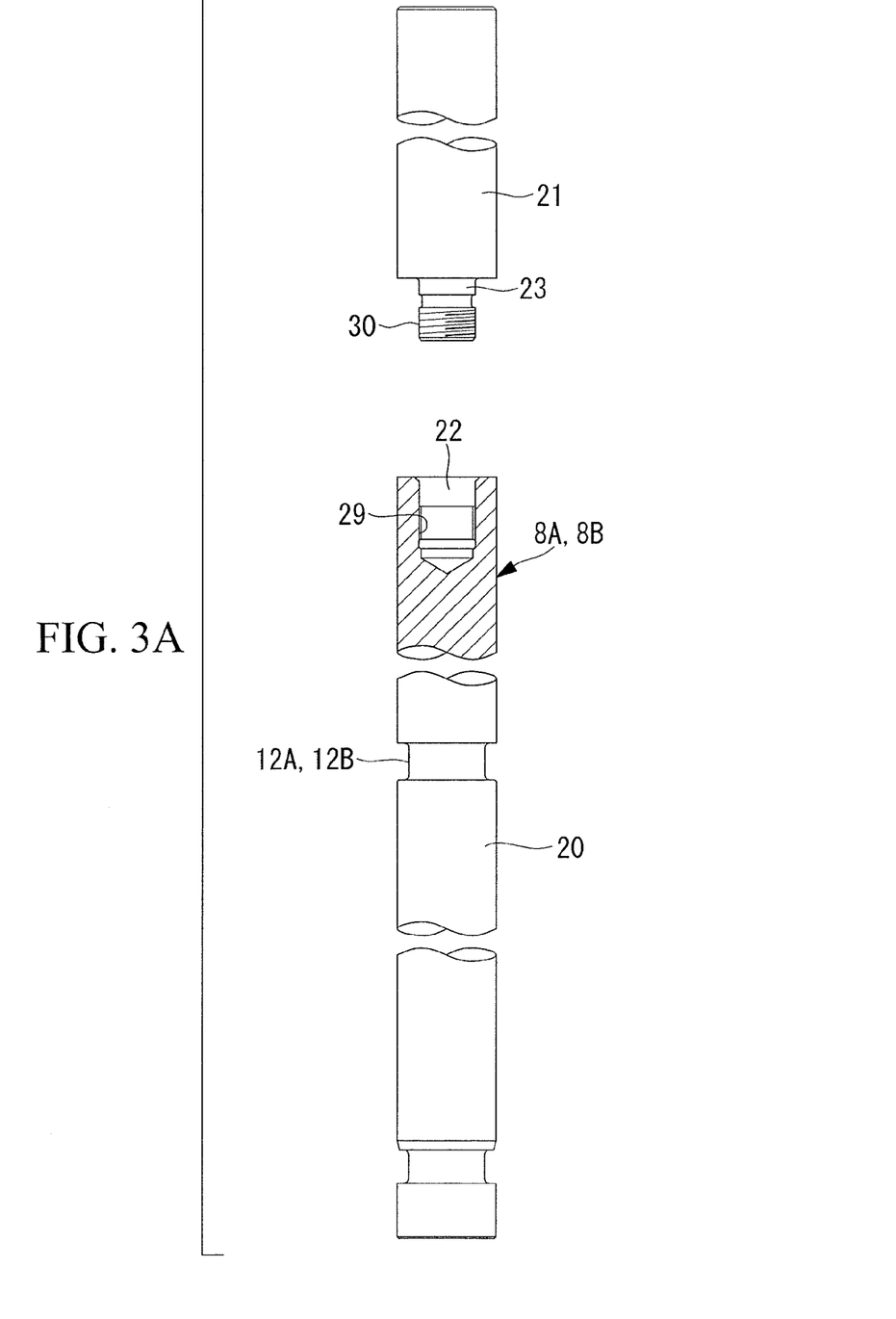
FIG. 3A is a configuration diagram of a tie rod according to a second embodiment of the present invention, and is a front view illustrating a state in which the tie rod is divided.
Figure 3B:
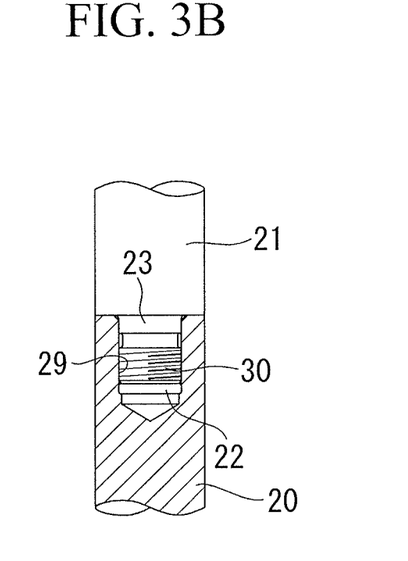
FIG. 3B is a configuration diagram of the tie rod according to the second embodiment of the present invention, and is a front view illustrating a state in which the tie rod is joined.

As illustrated in FIGS. 3A and 3B, in this embodiment, matching female threads 29 and male threads 30 are provided on ends of the recess 22 on the tie rod (A) 20 side and of the protrusion 23 on the tie rod (B) 21 side, respectively that constitute the interlocking portions. In addition to mating, the tie rod (A) 20 and the tie rod (B) 21 are configured so as to be screw-fastened via the female threads 29 and the male threads 30.

Thus, the interlocking portions are mutually screw-fastened via the female threads 29 and the male threads 30 provided on the ends of the recess 22 and the protrusion 23, respectively. Therefore, in addition to being mutually interlocked, the tie rod (A) 20 and the tie rod (B) 21 divided into at least two or more sections can be firmly mutually screw-fastened. Moreover, because the screw-fastened portion is positioned inside the divided tie rods 20, 21, effects on the lifting/lowering of the vertical guides 10A, 10B and the like can be reduced to zero. Thus, the strength required for the tie rods 8A, 8B can be sufficiently ensured and vertical guides 10A, 10B can guide without obstruction.

[Third Embodiment]

Next, a third embodiment of the present invention will be described below using FIGS. 4A and 4B.

The form of the joining faces of the recess 22 and the protrusion 23 constituting the interlocking portions of this embodiment differs from those of the first and second embodiments. Aside from this one point, the third embodiment is identical to the first and second embodiments and description corresponding to such is omitted.

Figure 4A:
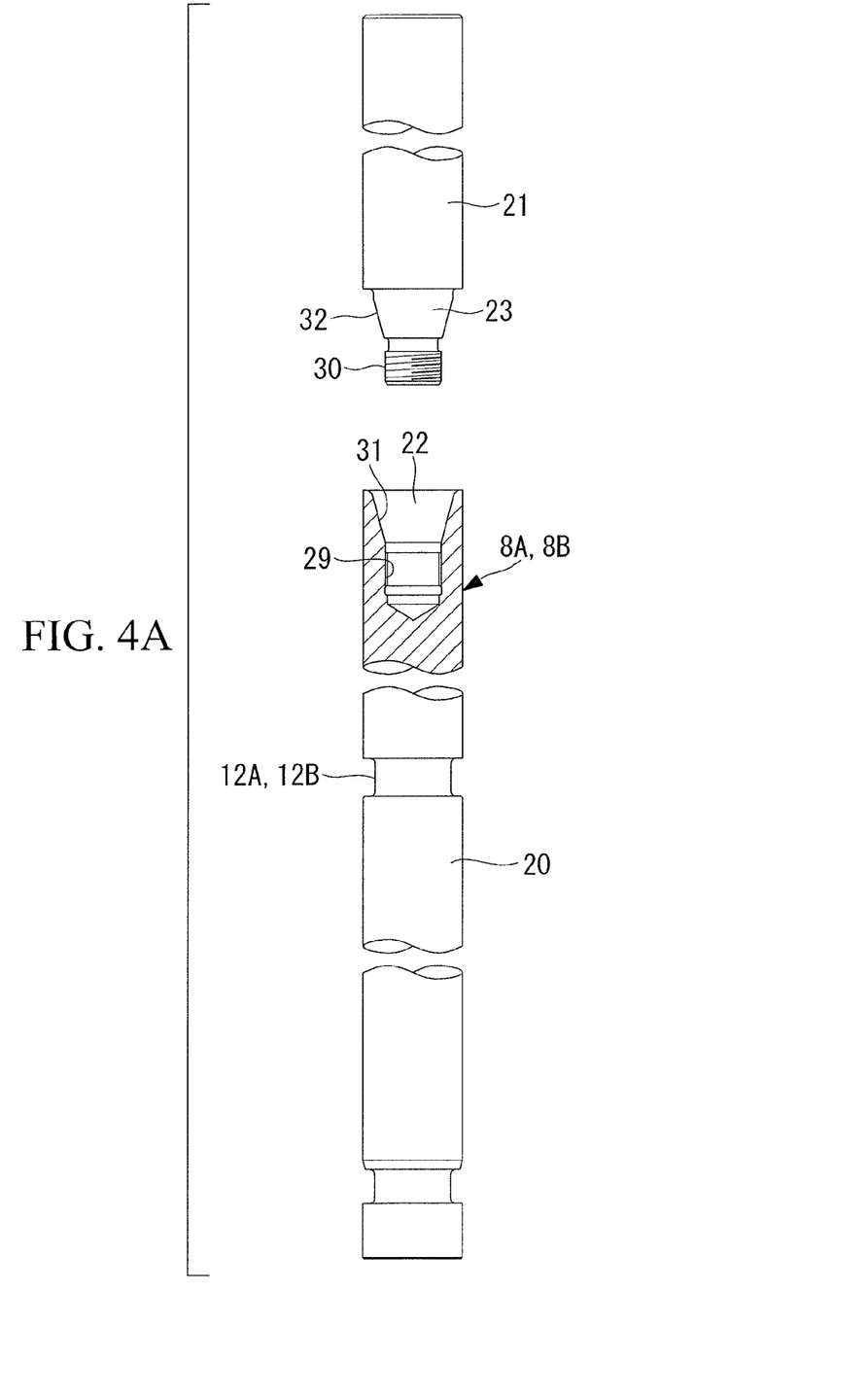
FIG. 4A is a configuration diagram of a tie rod according to a third embodiment of the present invention, and is a front view illustrating a state in which the tie rod is divided.
Figure 4B:
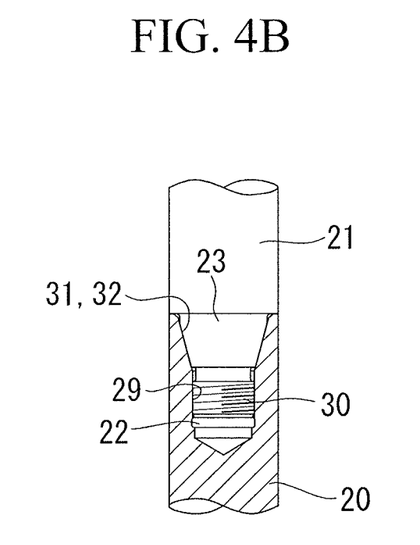
FIG. 4B is a configuration diagram of the tie rod according to the third embodiment of the present invention, and is a front view illustrating a state in which the tie rod is joined.

As illustrated in FIGS. 4A and 4B, in this embodiment, the joining faces of the interlocking recess 22 on the tie rod (A) 20 side and the protrusion 23 on the tie rod (B) 21 side are configured so as to form tapered faces 31, 32, respectively, and matching female threads 29 and male threads 30 are provided on ends of the recess 22 and of the protrusion 23, respectively. Therefore, in addition to the mating of the tapered faces 31, 32, the tie rod (A) 20 and the tie rod (B) 21 are configured so as to be screw-fastened via the female threads 29 and the male threads 30.

Thus, because the joining faces of the recess 22 and the protrusion 23 of the interlocking portions are configured to be the tapered faces 31, 32, coupling alignment precision when mutually interlocking the tie rod (A) 20 and the tie rod (B) 21 divided into at least two or more sections can be increased. As a result, precision comparable to that of an integrated tie rod can be ensured and the vertical guides 10A, 10B can guide without obstruction. Moreover, the tie rod (A) 20 and the tie rod (B) 21 can be firmly joined due to the screw-fastening of the female threads 29 with the male threads 30.

Note that the present invention is not limited to the embodiments described above, and can be appropriately modified within the scope of the present invention. For example, in the embodiments described above, the tie rods 8A, 8B are vertically divided into at least two or more sections, but this does not prevent the tie rods 8A, 8B from being divided into three or more sections in the present invention. Additionally, a configuration in which the recess 22 is provided on the tie rod (A) 20 side and the protrusion 23 is provided on the tie rod (B) 21 side in order to join the tie rod (A) 20 and the tie rod (B) 21 divided into at least two or more sections by interlocking is described above, but a configuration in which a protrusion is provided on the tie rod (A) 20 side and a recess is provided on the tie rod (B) 21 side may be used.

Furthermore, in the third embodiment, a configuration in which the joining faces of the recess 22 and the protrusion 23 constituting the interlocking portions of the second embodiment were configured as the tapered faces 31, 32 was described, but it goes without saying that a configuration is possible in which the joining faces of the recess 22 and the protrusion 23 constituting the interlocking portions of the first embodiment are configured as the tapered faces 31, 32. In such a case, it is obvious that the female threads 29 and the male threads 30 on the ends of the recess 22 and the protrusion 23 are not necessary.

The invention claimed is:

1. A tire vulcanizer comprising tie rods extending upward from a base plate, said tie rods receiving squeezing force applied to a bolster plate and a top mold when vulcanizing a tire and guiding a lifting/lowering of the bolster plate and the top mold when opening and closing the top mold; wherein
the tie rods are configured so as to be vertically dividable into at least two or more sections at a position in the length direction thereof, and
wherein a dividing position is configured to be between a portion bearing the squeezing force when vulcanizing a tire and a portion providing only the functionality for guiding the lifting/lowering of the bolster plate and the top mold.

2. A tire vulcanizer according to claim 1, wherein a first tie rod section and a second tie rod section, of the tie rod that is divided into at least two or more sections are mutually interlocked at interlocking portions.

3. A tire vulcanizer according to claim 2,
wherein the interlocking portions are mutually fastened by a fastener element that is provided via a seat formed by providing a notch in an edge periphery of either the first tie rod section or the second tie rod section.

4. A tire vulcanizer according to claim 2,
wherein the interlocking portions includes a recess provided in an end of the first tie rod section and a protrusion provided in an end of the second tie rod section, and
wherein the interlocking portions are mutually screw-fastened via female threads and male threads provided in ends of the recess and the protrusion, respectively.

5. A tire vulcanizer according to claim 2,
wherein the interlocking portions includes a recess provided in an end of the first tie rod section and a protrusion provided in an end of the second tie rod section, and
wherein a joining face of each of the protrusion and the recess is configured to be a tapered face.

6. A tire vulcanizer according to claim 1,
wherein the tie rod divided into at least two or more sections is configured such that D1>D2 when mutually joined, wherein D1 is an external diameter of the first tie rod bearing the squeezing force when vulcanizing a tire, and D2 is an external diameter of the second tie rod providing only functionality for guiding the lifting/lowering of the bolster plate and the top mold.

7. A method for transporting or packaging a tire vulcanizer, the tire vulcanizer being a tire vulcanizer described in claim 1, the method comprising:
transporting or packaging the tire vulcanizer in a state wherein the bolster plate and the top mold are in a fully closed position of the top mold; and only upper sections of the tie rods that are vertically divided into at least two or more sections are detached.

* * * * *